(No Model.)
J. P. CALLAN.
TWO WHEELED VEHICLE.
No. 260,742. Patented July 11, 1882.
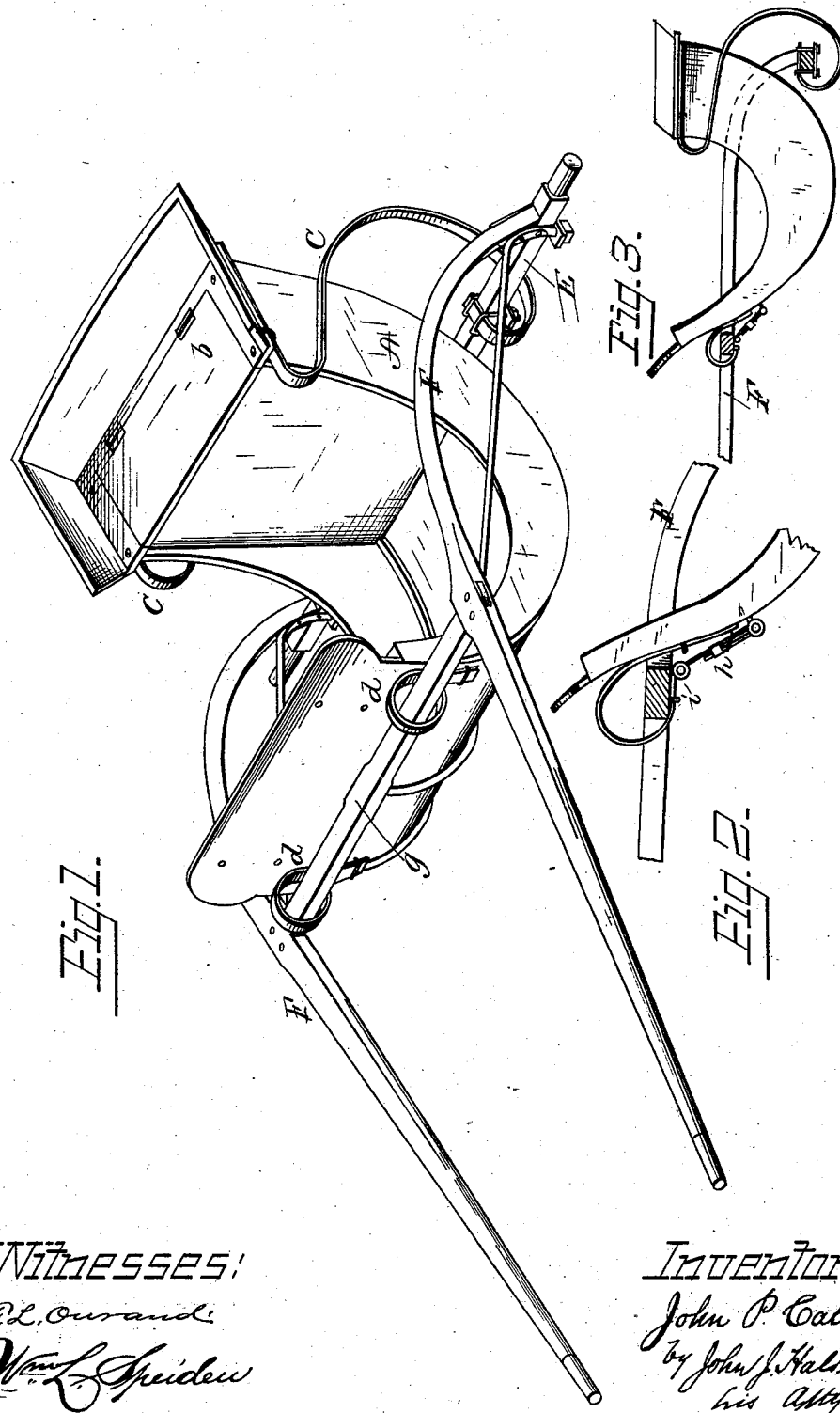

UNITED STATES PATENT OFFICE.

JOHN P. CALLAN, OF AURORA, ILLINOIS.

TWO-WHEELED VEHICLE.

SPECIFICATION forming part of Letters Patent No. 260,742, dated July 11, 1882.

Application filed March 6, 1882. (No model.)

*To all whom it may concern:*

Be it known that I, JOHN P. CALLAN, of Aurora, in the county of Kane and State of Illinois, have invented certain new and useful Improvements in Road-Carts or Two-Wheeled Vehicles; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to that class of riding-vehicles designated as "road-carts," and which are usually made with but two wheels; and it consists in a special construction and in the form of construction of the phaeton - body, whereby it will not only be easy for riding, but also in case of the breaking of a spring or springs it shall still be safe and without any tendency to throw the rider out backward or forward, and whereby even if all the springs should break at once the body of the vehicle will rest and hang on the axle and cross-bar and the rider will be safe in his seat.

In road-carts as usualy made if a spring breaks, the driver or rider is sure to be thrown out backward or forward, and such accidents are frequent and very dangerous, and the present invention effectually guards against and prevents them.

In the drawings, Figure 1 is a perspective view of a vehicle embodying my improvements; and Fig. 2, a detailed view enlarged, showing a safety-strap connecting the forward spring to the carriage. Fig. 3 is a partial view in vertical section in a line between the body and one of the shafts.

A is the body, and $b$ its seat; $c\,c$, the back springs, and $d\,d$ the front ones. The back springs are made preferably in a shape resembling a figure 5, and are each secured at top to the under edge or horizontal portion of the body or of the seat at one of its ends, substantially as shown, and at the lower ends to the axle E, which connects the rear end of the thills or shafts F. The front springs, $d\,d$, are each secured at one end to the front of the body and at its other end to the cross-bar $g$. The body thus hangs suspended between the shafts, and also between the axle E and the cross-bar $g$. The body inclines or curves upward, both at front and rear, projecting at its front both above and forward of the bar $g$, and projecting at its rear both above and backward of the axle, so that its length at top is enough greater than the distance between the axle and the cross-bar to prevent the body dropping through even if there were no springs, for in such case, and before the springs are put on, the front or dash-board portion would rest on the cross-bar, and the rear portion of the body would rest on the axle. I prefer, for geater security in case the front springs break, to put an eye-bolt at $i$ on one end of these springs, and another eyebolt at $i'$ on the dash-board or body, and connect these by leather strap $h$ and buckles, but loosely. This will prevent the body becoming detached when the spring breaks; and after the springs have all been applied they afford, it will be readily seen, an extremely easy riding vehicle, and avoid all the objectionable and disagreeable swinging motion incident to the seats or bodies of road-carts as usually hung, and in which the motion imparted to the seat may be described as in the arc of a circle, such unpleasant motion being due to the fact that the seat or body is usually fastened to the rear end of springs that project forward and are themselves fastened to the thills, while the foot-rest is suspended from and fastened to the seat. With my improved construction and arrangement, however, the motion is vertical and precisely the same as in a buggy or in a luxurious carriage, or like that of an elastic nicely-adjusted spring-board, and the invention permits of the cart being fitted with a "calash" top, and of being trimmed up in any desired manner.

Each of my springs, as made and applied, may be, as shown, of a single piece of metal of uniform size throughout, so that they are of uniform strength and elasticity from point to point of the fastening, and there is no weak point or place in them at which there is greater strain or tension, and consequently greater liability to break, than at another.

The forward springs may, if desired, be made in the same form as the rear ones—that is, resembling a figure 5—and springs of this novel shape are applicable to four-wheeled as well as two-wheeled vehicles, and they may be put on in a position the reverse of that shown.

By making the rear springs in the peculiar shape described and shown, and in attaching them to the axle by passing them under the same, and then curving them up and around it, we secure, by the shorter bow or curve which is nearest the seat, sufficient rigidity to hold the body and seat in proper position; by the larger or back curve a distribution of the pressure and yield throughout a very large portion of the spring; and by the terminal curve, which passes around the axle, we continue this distribution to the point of attachment to the axle, and get an easy yield for that part which is beneath as well as for that part which is above the axle, whereas if this end of the spring were not so bent, but were wholly above the axle and rested abruptly upon it, the tendency would be to break at the center of the large bend or bow, or to break at the point where it would bear upon the edge of the axle, and if the front and rear bows were equal there would be liability to break at the central part of either of these bows. In my construction the weight bears the lower end of the spring off from and beneath the axle, and permits it to yield on both sides of the axle at front and rear, as well as above and below it.

It will be readily seen from the description that easy riding, the avoidance of a jerking forward-and-back swing, a gentle vertically-yielding movement, security against being thrown out backward, and safety to the passenger in case a spring or springs should break are attained by my improvements, and all these with economy in construction.

I claim—

1. In a road-cart or two-wheeled vehicle having springs at front and rear, a body, A, hung as described, with its front extending above and forward of the cross-bar $g$, which connects the thills, and with its rear extending upward and backward of the axle which supports the thills, and with its central portion hanging down between this bar and axle, and also between the thills, as and for the purpose set forth.

2. In combination with a road-cart body hung as shown and described, the 5-shaped springs at the rear and springs at the front secured to the cross-bar $g$, as and for the purposes set forth.

3. The springs C, made in the form of a figure 5, as shown and described, and applied, as shown, with the lower end curved around the axle, and with the horizontal part supporting the body or seat, and permitting the preponderance of the load to be between the axle and cross-bar.

JOHN P. CALLAN.

Witnesses:
C. B. FISHER,
H. L. KRAHL.